United States Patent [19]

Konrad et al.

[11] Patent Number: 4,464,136
[45] Date of Patent: Aug. 7, 1984

[54] LUBRICATED WIDE ANGLE UNIVERSAL JOINT

[75] Inventors: Mathias Konrad, Troisdorf; Klaus Kämpf, Lomar, both of Fed. Rep. of Germany

[73] Assignee: Jean Walterscheid GmbH, Fed. Rep. of Germany

[21] Appl. No.: 421,861

[22] Filed: Sep. 23, 1982

[30] Foreign Application Priority Data

Oct. 29, 1981 [DE] Fed. Rep. of Germany ....... 3142930

[51] Int. Cl.³ .............................................. F16D 3/26
[52] U.S. Cl. ..................................... 464/14; 464/112; 464/905
[58] Field of Search ............................... 464/112–114, 464/117, 118, 11–14, 905

[56] References Cited

U.S. PATENT DOCUMENTS

| | | | |
|---|---|---|---|
| 1,774,679 | 9/1930 | Swenson | 464/118 X |
| 1,987,807 | 1/1935 | Swenson | 464/118 X |
| 2,067,286 | 1/1937 | Pearce | 464/118 |
| 2,991,634 | 7/1961 | Daley, Jr. | 464/118 |
| 3,470,712 | 10/1969 | Geisthoff et al. | 464/118 |
| 4,257,243 | 3/1981 | Herchenbach | 464/905 X |

*Primary Examiner*—John Petrakes
*Attorney, Agent, or Firm*—Toren, McGeady and Stanger

[57] ABSTRACT

In a wide angle universal joint wherein an inner double fork is connected with an outer fork having a pair of outer yokes by a trunion cross with spherical trunnions being provided for guiding the outer yokes and with a centering disc engaging the spherical trunnions with guides, the centering disc being secured against axial displacement but being radially movable, a lubricating system is provided which includes lubricating nipples on the trunnion cross for feeding lubricant into the system and lubricating channels extending through the trunnion cross and the spherical trunnions, with the lubricating channel in the trunnion cross having an output opening which corresponds with the input opening of a lubricating channel in the spherical trunnion at a position of the output yokes, with a sealing member being provided in one of the output or input openings. The sealing member may be a movable piston arranged in the output opening of the trunnion cross.

4 Claims, 2 Drawing Figures

LUBRICATED WIDE ANGLE UNIVERSAL JOINT

The present invention relates generally to universal joints and more specifically to a lubricating system for a wide angle universal joint which is composed of an inner double fork and an outer fork member having two outer yokes each of which is connected with the double fork by means of a joint cross member.

In devices of the type to which the present invention relates, the outer yokes are guided by means of spherical trunnions arranged on the ends of the outer yokes, which ends are connected by means of a bridge and which point toward the center of the joint. The spherical trunnions are provided at least partially with a preferably axially extending lubricating channel which opens toward the inside of the joint. Each spherical trunnion engages a guide provided on a centering disc which is secured against axial displacement but which is radially movable. The two trunnion crosses or cruciform members of the joint cross member are provided with lubricating nipples which open into lubricating channels leading to the trunnion bearings.

A wide angle joint which is inwardly controlled by means of a spherical surface and a ball and within which lubrication is introduced through the guide ball into the control center is known from German Pat. No. 552 646. In the joint described in this patent, a so-called swing joint is involved in which each of the joint connections which is assigned to an axis is supported in a joint ring, the two joint rings which belong to the double joint being evenly connected with one another by means of an intermediate ring. The intermediate ring is filled with lubricant which is under pressure and which can be fed through correspondingly arranged channels to the pivot trunnions forming the individual joints as well as to the control ball/spherical surface.

A disadvantage of the described lubrication system for a double joint is that the lubrication supply must be introduced into the interior of the joint from the outside thereof. According to this system, the lubricant present in the interior of the joint is outwardly directed during the process of rotation by means of centrifugal forces and as a result it is difficult to ensure sufficient lubrication of the parts of the joint lying on the interior thereof. Accordingly, particularly in joints which rotate for long periods of time, it is possible that a substantial loss of lubricant may occur in the interior joint parts and, as a result, the joint will be subjected to excessive wear because of dry running operation.

The present invention is directed toward providing a lubricating wide angle joint wherein the supply of lubricant is effected from the joint interior outwardly, with the joint being constructed in such a way that the feed of the lubricant is possible within at least one easily localized bending position of the joint without requiring extensive structural additions.

SUMMARY OF THE INVENTION

Briefly, the present invention may be described as a lubricated wide angle universal joint assembly comprising inner double fork means, outer double fork means including a pair of outer yokes, trunnion cross means connecting together said inner and outer fork means, spherical trunnion means guiding said outer yokes, centering disc means including guide means engaged by said spherical trunnion means, said centering disc means being secured against axial displacement but being radially movable, lubricating nipple means in said trunnion cross means for providing lubricant, first lubricating channel means provided in said spherical trunnion means including an input opening arranged on a side thereof facing said trunnion cross means, second lubricating channel means in said trunnion cross means having an output opening corresponding with said input opening in a position of said outer yokes, and a sealing member provided in one of said output or input openings.

In the structure according to the invention, an advantage arises in that, through a simple alignment of the input opening in the spherical trunnion means with the output opening of the trunnion cross means, there is provided a lubricant supply channel for the interior of the joint which passes through the trunnion cross means. Thus, the interior of the joint is supplied with lubricant through the first lubricating channel means in the spherical trunnion means and through the second lubricating channel means in the trunnion cross means.

In a preferred embodiment of the invention, the input and output openings are supported in such a position that they correspond to one another in the extended or elongated position of the wide angle joint.

An advantage of this embodiment of the invention is that the extended position of the wide angle joint can be easily determined without requiring special markings.

In accordance with another characteristic of the invention, the input and output openings may be brought into position such that they will correspond with one another at the maximum bending angle of the joint.

This embodiment is preferable particularly when, due to technical factors related to the manner in which the joint is used, the extended position of the joint cannot be attained.

In another, more detailed, feature of the invention, the sealing member comprises a piston arranged in the output opening of the trunnion cross means with the piston being outwardly movable under the influence of the pressure of the lubricant. As a result of this approach, automatic sealing between the input opening and the output opening will occur during the introduction of lubricant.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
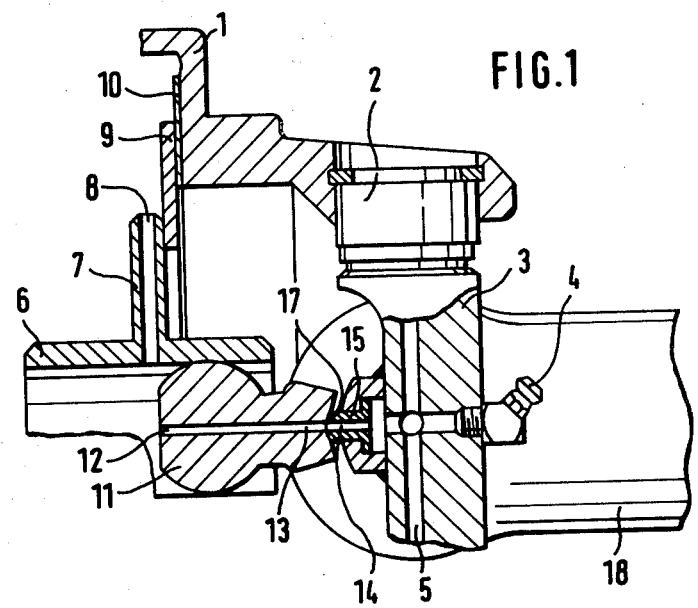
FIG. 1 is a partial longitudinal sectional view taken through a double fork in which the lubricant feed is effected in the extended position.

Referring now to FIG. 1, there is shown a portion of a wide angle joint assembly in accordance with the invention which is composed substantially of an inner double fork 1 and outer fork means including two outer forks 18 connected with the double fork 1 by means of trunnion crosses 3. The trunnion cross 3 is rotatably supported in the inner double fork 1 by means of bearing bushes 2.

In a flange-type enlargement of the inner double fork 1, there is provided a centering disc 7 which is guided by means of supporting discs 9 and sliding discs 10. The centering disc 7 is provided on both sides thereof with guides 6 in which spherical trunnions 11 are supported. The spherical trunnions 11 are provided with a first lubricating channel 12 formed as a throughgoing borehole.

The lubricating channel 12 includes an input opening 13 which faces the trunnion cross 3. The trunnion cross 3 is formed with lubricating channel means including a lubricating channel 5. A lubricating nipple 4 is provided on the trunnion cross 3.

The lubricating channel means in the trunnion cross 3 have located therein a piston 15 which defines an output opening 14 from the lubricating channel means in the trunnion cross 3.

In the extended position of the joint, the input opening 13 of the lubricating channel 12 is aligned with the output opening 14 provided in the piston 15.

During feed of lubricant through the lubricating nipple 4, the lubricant is guided through the lubricating channel 5 in the bearing bushes 2 as well as to the side of the piston 15 facing the trunnion cross. The piston 15 is thereby displaced toward the spherical trunnion 11 and is pressed against a spherical surface 17 provided in the vicinity of the input opening 13 of the spherical trunnion 11. A sealing connection is thus provided between the input opening 13 of the spherical trunnion 11 and the output opening 14 on the trunnion cross 3.

Figure 2:
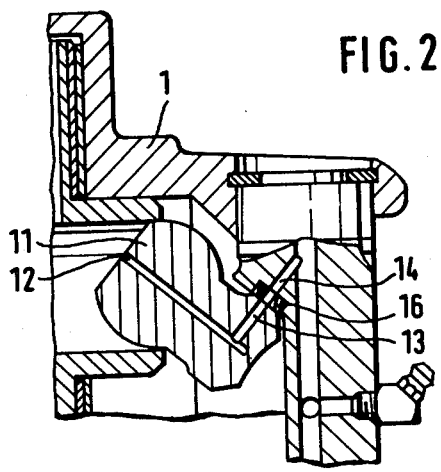
FIG. 2 is a partial longitudinal sectional view taken through a wide angle joint in which the lubrication feed is effected in the extreme bending position.

Also shown in FIG. 2 in partial section is a wide angle joint wherein the input opening 13 on the spherical trunnion 11 and the output opening 14 on the trunnion cross 3 may be brought into a position such that they correspond with one another during maximum bending of the joint.

In FIG. 2, an elastic sealing ring 16 is provided in the output opening 14 of the trunnion cross 3, which elastic sealing ring 16, during pressing of the joint to the position of maximum bending, provides the function of producing a seal between the input opening 13 and the output opening 14.

The lubricant may thus be propelled forwardly through the mutually corresponding openings 13, 14 and through the spherical trunnions 11 into the interior of the joint. As a result, the lubricant may flow through a lubricating channel 8 in the centering disc 7 and thereby be provided in outer areas of the joint.

Thus, in accordance with the present invention there is provided a lubricated wide angle joint wherein the inner joint parts which operate to control the joint may be provided with lubricant from the trunnion crosses 3 arranged on both sides.

Additionally, the spherical trunnions 11 arranged on a bridge connecting the inwardly facing ends of the outer yokes 18 are provided with a substantially axially extending borehole 12 whose opening 13, directed toward the trunnion crosses 3, may be brought into a corresponding position with another opening 14 opening from the lubricating channels 5 of the trunnion cross 3.

In a predetermined position, a throughgoing flow connection is provided from the lubricating nipple 4 arranged on the trunnion cross 3 through the spherical trunnions 11 to the interior of the joint.

Thus, it will be seen that the spherical trunnions 11 are provided with first lubricating channel means 12 having an input opening 13 which may be placed in flow communication with second lubricating channel means in the trunnion cross through an output opening 14 of the second lubricating channel means defined by a piston 15 in the trunnion cross.

While specific embodiments of the invention have been shown and described in detail to illustrate the application of the inventive principles, it will be understood that the invention may be embodied otherwise without departing from such principles.

What is claimed is:

1. A lubricated wide angle universal joint assembly comprising: inner double fork means; outer fork means including a pair of outer yokes; trunnion cross means connecting together said inner and outer fork means; spherical trunnion means guiding said outer yokes; centering disc means including guide means engaged by said spherical trunnion means, said centering disc means being secured against axial displacement but being radially movable; lubricating nipple means provided in said trunnion cross means for introducing lubricant; first lubricating channel means provided in said spherical trunnion means including an input opening arranged on a side thereof facing said trunnion cross means; second lubricating channel means in said trunnion cross means having an output opening adapted to be placed in flow communication with said input opening at a predetermined position of said outer yokes; and a sealing member provided in one of said output and input openings to seal said flow communication between said output opening and said input opening at said predetermined position of said outer yokes.

2. An assembly according to claim 1 wherein said input and output openings are supported in a mutually corresponding position in flow communication in the extended position of said wide angle joint assembly.

3. An assembly according to claim 1 wherein said input and output openings are arranged to be brought into a mutually corresponding position in flow communication when said universal joint assembly is in the position of maximum bending thereof.

4. An assembly according to claim 1 wherein said sealing member comprise a piston arranged in said output opening of said trunnion cross means, said piston being movable outwardly in response to pressure of lubricant in said first and second lubricating channel means to effect said seal of said flow communication.

* * * * *